United States Patent [19]

Friedrichs

[11] Patent Number: 5,134,975
[45] Date of Patent: Aug. 4, 1992

[54] THERMOSTATICALLY CONTROLLED HYDRAULIC FAN CLUTCH

[75] Inventor: K. Gerd Friedrichs, Beilngries, Fed. Rep. of Germany

[73] Assignee: Tewig GmbH Technische Entwicklungs-Gesellschaft, Beilngries, Fed. Rep. of Germany

[21] Appl. No.: 460,911

[22] PCT Filed: Aug. 25, 1988

[86] PCT No.: PCT/EP88/00762
§ 371 Date: Feb. 26, 1990
§ 102(e) Date: Feb. 26, 1990

[87] PCT Pub. No.: WO89/02027
PCT Pub. Date: Mar. 9, 1989

[30] Foreign Application Priority Data

Aug. 25, 1987 [DE] Fed. Rep. of Germany ....... 3728330

[51] Int. Cl.$^5$ ............................................ F91P 7/02
[52] U.S. Cl. ................................ 123/41.12; 192/82 T
[58] Field of Search ...................... 123/41.12, 41.31; 192/113 B, 82 T

[56] References Cited

U.S. PATENT DOCUMENTS

| | | | |
|---|---|---|---|
| 3,101,825 | 8/1963 | Caroli et al. | 123/41.12 |
| 3,505,982 | 4/1970 | Walter et al. | 123/41.12 |
| 3,804,219 | 4/1974 | Cummings, III | 192/82 T |
| 4,493,293 | 1/1985 | Paul et al. | 123/41.12 |

FOREIGN PATENT DOCUMENTS 0106581 4/1984 European Pat. Off.
3140195 4/1983 Fed. Rep. of Germany.

*Primary Examiner*—Noah P. Kamen
*Attorney, Agent, or Firm*—Oblon, Spivak, McClelland, Maier & Neustadt

[57] ABSTRACT

A fan for cooling an engine is adjusted as a function of the engine speed. The fan has a hydraulic clutch in which a sliding adjustment is made as a function of the temperature of the engine coolant. The drive shaft of the hydraulic clutch is designed as a hollow shaft in which the coolant circulates. The hollow shaft also contains a thermostat which actuates the tappet of a valve in the hydraulic clutch to regulate the flow. The valve is preferably designed as a disk valve in contact with the return openings of the hydraulic clutch. In order to cool the hydraulic clutch, the pump wheel is designed as a hollow body which communicates with the liquid circulating in the hollow shaft.

13 Claims, 2 Drawing Sheets

THERMOSTATICALLY CONTROLLED HYDRAULIC FAN CLUTCH

BACKGROUND OF THE INVENTION

1. Field of the Invention

The invention relates to a fan hydraulic coupling for a water cooled motor with a temperature-dependent flow regulator, a driving shaft and a driven part coaxial thereto and carrying a fan wheel, the motor having a cooling circuit for a cooling fluid or coolant to cool the fan hydraulic coupling. The invention also relates to a hollow drive shaft for a coolant pump in the cooling circuit of the motor. The hollow drive shaft is connected at a first end to a cooling liquid circuit of the motor and at a second end to the hydraulic coupling for cooling the hydraulic coupling. The hydraulic coupling being connected to the hollow drive shaft through radial hollow shaft openings for exchanging cooling liquid.

2. Description of the Related Art

It is known to regulate or control the temperature of internal combustion engines and electric motors with the aid of a cooling fluid or coolant. In the case of water-cooled internal combustion engines a cooling circuit is provided, in which the coolant is constantly pumped. Cooling air is sucked from the outside by means of a fan and passed over the surfaces to be cooled.

In the case of internal combustion engines the fan wheel and pump impeller of the coolant pump are frequently driven by means of a common shaft. For regulating the speed of the fan wheel it is known to provide a temperature-dependent fluid coupling. Control takes place as a function of the external temperature or the sucked in cooling air. As the regulating process is based on a motor or engine-independent controlled variable, it is not unrestrictedly possible to adapt the cooling to the particular operating conditions and to the motor temperature to the desired and necessary extent.

A conventional hydraulic coupling is described in DE-3140195. The coupling is controlled as a function of the temperature of the cooling water, which is directed on a thermoelement close to the coupling by a fan gear shaft designed as a hollow shaft. For cooling, in the working chamber of the coupling there is a cooling coil which is supplied with cooling water by radial bores in a hollow shaft. Subject to design, this hydraulic coupling is relatively large and further requires a large amount of working fluid. There is a relatively small cooling surface in comparison with the relatively large amount of working fluid. Since an additional cooling element is provided in the working chamber, the field of application is limited for reasons of space. Moreover, as required by the system, a relatively large assembly, maintenance and material expenditure is necessary.

Another temperature-controlled hydraulic coupling for a fan of an internal combustion engine is described in DE-420277. The control takes place with a bimetal element, which is exposed to the air given off by the fan. In this case, it is put outside on the coupling housing.

SUMMARY OF THE INVENTION

An object of the invention is to provide a fan coupling of the aforementioned type making it possible to carry out a control as a function of the motor temperature. The invention is based on the further object of providing a shaft for a coolant pump used in conjunction with the aforementioned fan coupling.

In connection with the fan coupling, this object is achieved in that the driving shaft of the fluid coupling is constructed as a hollow drive shaft which is connected to the coolant circuit of the motor, that in the cavity of the driving shaft is located a temperature regulator with a plunger guided in the fluid coupling and coaxial to the shaft axis and that the flow regulator is operated by means of the plunger.

The invention has the advantage that the speed of the fan wheel is a function of the coolant temperature. This constantly ensures that the air cooling is directly based on the motor temperature. A further advantage is that the coupling can be constructed together with the complete regulating or control means as a compact unit, which is connected to the remaining motor or engine block solely via the hollow shaft. Thus, there is only a single interface with the motor block. The assembly and optionally a replacement of the coupling can take place by simple axial disassembly and assembly.

The invention is based on the idea of carrying out a slip control of the fluid coupling as a function of the coolant temperature of the motor, while giving a compact, easy-to-assemble constructional unit.

According to a preferred further development of the invention, the flow regulator has a valve disk on the free end of the plunger, which is in engagement with intake ports of the fluid coupling. As a result of a lifting movement of the plunger the return ports are freed or throttled/closed. The valve disk can be constructed with limited constructional expenditure and low material expenditure.

For safety or security purposes in the case of the temperature regulator failing, the valve disk or plunger is loaded with a spring counter to the closing direction. If the temperature regulator fails during operation, the valve is brought into a safe position, in which the operating medium circuit of the fluid coupling is not interrupted and the functionality of the coupling is ensured.

It is particularly advantageous for the pump impeller of the fluid coupling to be at least partly constructed as a hollow body and for it to be connected to the hollow drive shaft for the replacement of the coolant. As a result, the pump impeller and the fluid coupling can be cooled in a simple manner. By means of the hollow drive shaft the motor coolant passes into the pump impeller where it performs a heat exchange with the operating fluid of the coupling. Thus, an inadmissible heating or vapor formation in the operating fluid is prevented without it being necessary to have an additional external cooling device.

A particularly simple manufacture and assembly of the pump impeller is made possible in that two half-shells are joined together accompanied by the formation of the cavity. It is particularly appropriate for the two half-shells to be in each case constructed as a sheet metal part.

The circulation of the coolant in the driving hollow shaft is improved in that the shaft is provided with guide channels. A particularly simple construction involves a pipe length with radial spacers for forming an annular space being inserted in the hollow shaft.

The fluid is axially guided in a preferred manner in that the spacers are constructed as axially closed control surfaces for forming axial channels in the annular space.

In order to assist the circulation of the coolant in the pump impeller and to increase the exchange between the pump impeller and the hollow shaft, it is appropriate for the hollow drive shaft to have openings distributed over its circumference for connection to the cavity of the pump impeller and that the pipe length is provided at the end with a distributor for separating the outward and return flowing coolant.

The distributor is preferably constructed in that the pipe length is provided with a pipe length opening formed in its casing and that on the pipe length opening is located a pipe length branch, which is at least connected to one hollow shaft opening. Via said branch coolant can pass into the pump impeller without it mixing with the coolant flowing back into the annular space.

A good distribution of the fluid over the individual axial channels is ensured in that in the vicinity of the hollow drive shaft openings and in the flow direction behind the distributor an annular space substantially uninterrupted over the entire circumference is provided. The arrangement of the distributor is based on the idea of subjecting to the action of the inflowing coolant an area of the hollow shaft openings bounded in the circumferential and/or axial direction and to keep the remaining area free for the return flow of the coolant. The branch also ensures that the temperature regulator is only subject to the action of the coolant emanating from the coolant circuit, whereas coolant flowing back from the pump impeller is led past the temperature regulator. This ensures that the temperature regulator does not respond to the temperature of the coolant flowing back from the pump impeller.

The regulation or control of the fluid coupling can advantageously be further developed in that the temperature regulator is dependent on speed and load. This has the advantage that the speed of the fan for the same temperature can differ in the high and low load ranges in accordance with the different requirements.

The response time of the fluid coupling is reduced by the pump impeller being provided with axially directed passage openings, so that the operating fluid can be more rapidly distributed in the pump chamber. Preferably the passage openings are arranged following on to the intake ports of the fluid coupling.

In order to reduce the effects of axial and/or radial clearances or corresponding assembly and manufacturing tolerances in the radial gaps between the pump impeller and turbine wheel, it can be appropriate to provide the facing surfaces of these two parts with circumferentially directed, interengaging indentations and counterparts, which have a triangular or rectangular cross-section.

With regards to the hollow drive shaft for the pump impeller of the coolant pump, the object is achieved in that the coupling comprises a further hollow shaft which is to be connected to the hollow drive shaft of the fluid coupling. Thus, in a surprisingly simple manner, a connection is formed between the coolant circuit of the motor and the fluid coupling.

The circulation of the coolant in the hollow shaft of the fluid coupling and the coolant pump is maintained in a simple manner in that the further hollow shaft has at least two axially directed channels, that one channel has an opening on the suction side and the other channel an opening on the pressure side of the coolant pump impeller.

It can be advantageous for controlling the coolant inflow or outflow for the further hollow shaft to be provided with a choke or restrictor operable from the outside. A simple construction involves the choke being constructed as a throttle valve positioned upstream of an opening of a further shaft located on the shaft end and which is axially oriented. Alternatively thereto, it can also be appropriate for the throttle to be arranged as a slide valve on the hollow shaft for a radially directed opening.

The invention is described in greater detail hereinafter relative to the embodiments shown in the drawings.

DESCRIPTION OF THE PREFERRED EMBODIMENTS

Figure 1:
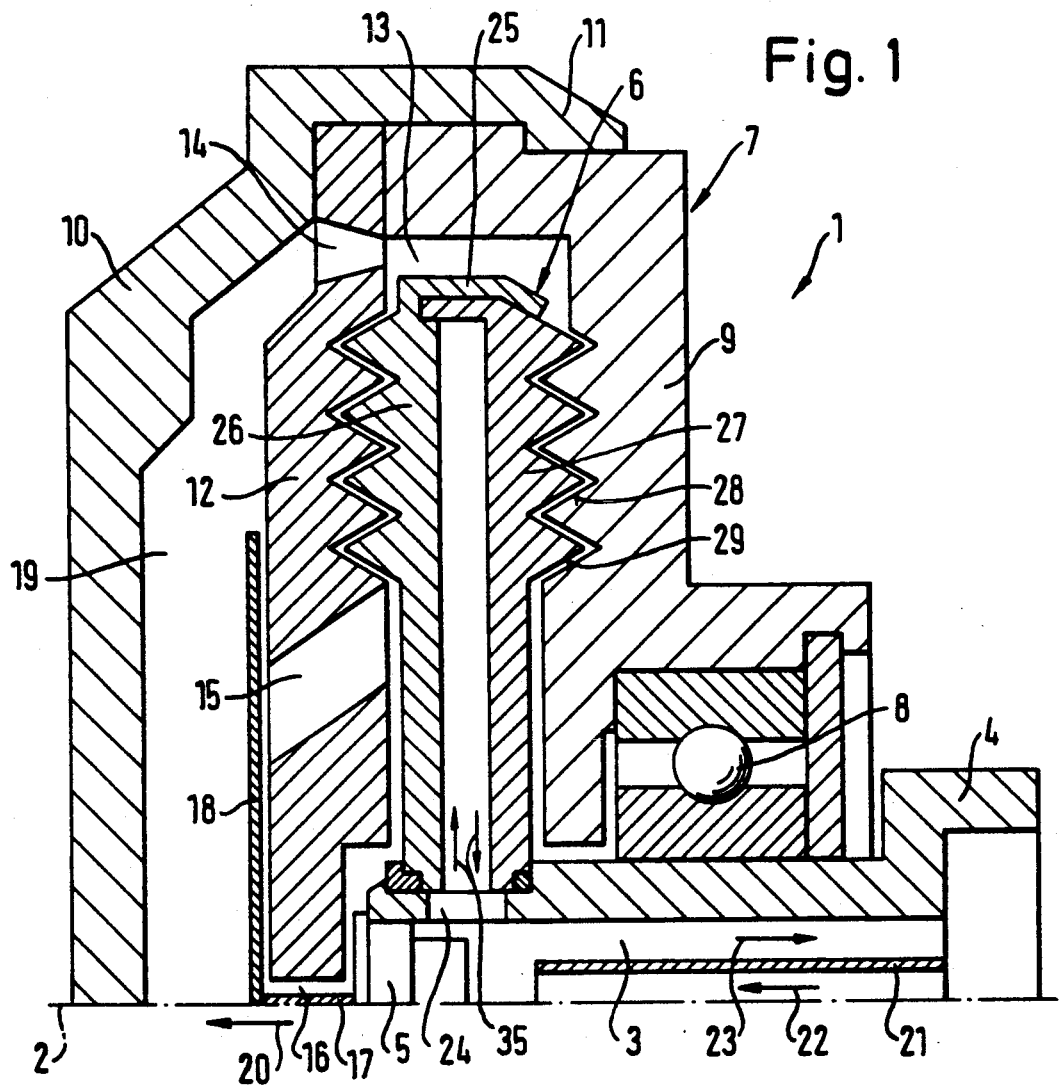
FIGS. 1 and 2 diagrammatically show a cross-section through a fluid coupling.

The cross-sectional view of FIG. 1, for a clearer understanding, is limited to showing an upper half of a fluid coupling 1, because the latter is constructed symmetrically with respect to a rotation axis 2. The fluid coupling 1 has as the driving shaft a hollow shaft 3, which is provided at its one end with a connecting piece 4 for forming a pipe or hose connection with a coolant circuit of a not shown motor. In this way coolant passes from the motor, via the hollow shaft 3 to a temperature regulator 5, which in the present embodiment is arranged in a cylindrical casing, which tightly seals the free end of the hollow shaft 3.

Hollow shaft 3 is connected in non-rotary manner to a pump impeller 6. The hollow shaft 3 also carries by means of an anti-friction bearing 8 the driven part of the fluid coupling 1, which comprises the turbine wheel 7. The latter is formed from two circular half-shells 9, 10, which are tightly interconnected at their outer circumference by means of a sleeve 11. Thus, the two half-shells 9, 10 form the casing of the fluid coupling 1. Between the two half-shells 9, 10 is also arranged a disk or plate 12, whose outer circumference is pressed into the connecting point of the two half-shells 9, 10.

Disk 12 and one half-shell 9 enclose the pump impeller 6 and form a pump chamber 13. In order to produce a closed operating medium circuit the disk 12 is provided with outlet ports 14 along its outer circumference. It also has inlet ports 15, which are distributed along a circle on the disk surface. The connection between the outlet ports 14 and the inlet ports 15 is provided by a cavity 19 running between disk 12 and the other half-shell 10.

Both the disk 12 and the other half-shell 10 engage around the free end of the hollow shaft 3. While the other half-shell 10 assumes the function of a cover for the fluid coupling 1, disk 12 is provided with a central opening 16, so that a passage is created for a plunger 17, which is controlled by the temperature regulator 5. At the free end of plunger 7 is located a valve disk 18, which is in the cavity 19 and acts on the inlet ports 15. FIG. 1 shows the closed state of the valve, in which the valve disk 18 is located as a closing or throttling member on a corresponding seat of disk 12 and closes the inlet ports.

When the fluid coupling is in the operating state the pump impeller rotates, so that the not shown operating fluid is pumped in pump chamber 13 from the inside to the outside and via the outlet ports 14 into cavity 19. As a result of the adhesive power of the operating fluid, a torque is transmitted from pump impeller 6 to turbine wheel 7.

When the valve is open, i.e. when the valve disk 18 has performed a stroke in the arrow direction 20, as a result of the speed difference between the pump impeller 6 and the turbine wheel 7, which can also be referred to as slip, the fluid circulation is maintained. As a function of the stroke position of valve disk 18 there is a flow regulation for the return flow of the operating fluid into the pump chamber 13. By varying the filling, a slip control takes place between the pump impeller 6 and the turbine wheel 7. The maximum torque is transmitted when the valve disk 18 frees the inlet ports 15 in unrestricted manner. However, if disk 18 is located on the inlet ports 15, then the return flow of the operating fluid is completely interrupted, pump chamber 13 is empty and consequently no torque is transmitted. The stroke movement of the valve disk 18 is regulated by the temperature regulator 5 as a function of the temperature of the coolant in hollow shaft 3. With rising temperature the valve is continuously opened and with falling temperature continuously closed.

Figure 2:
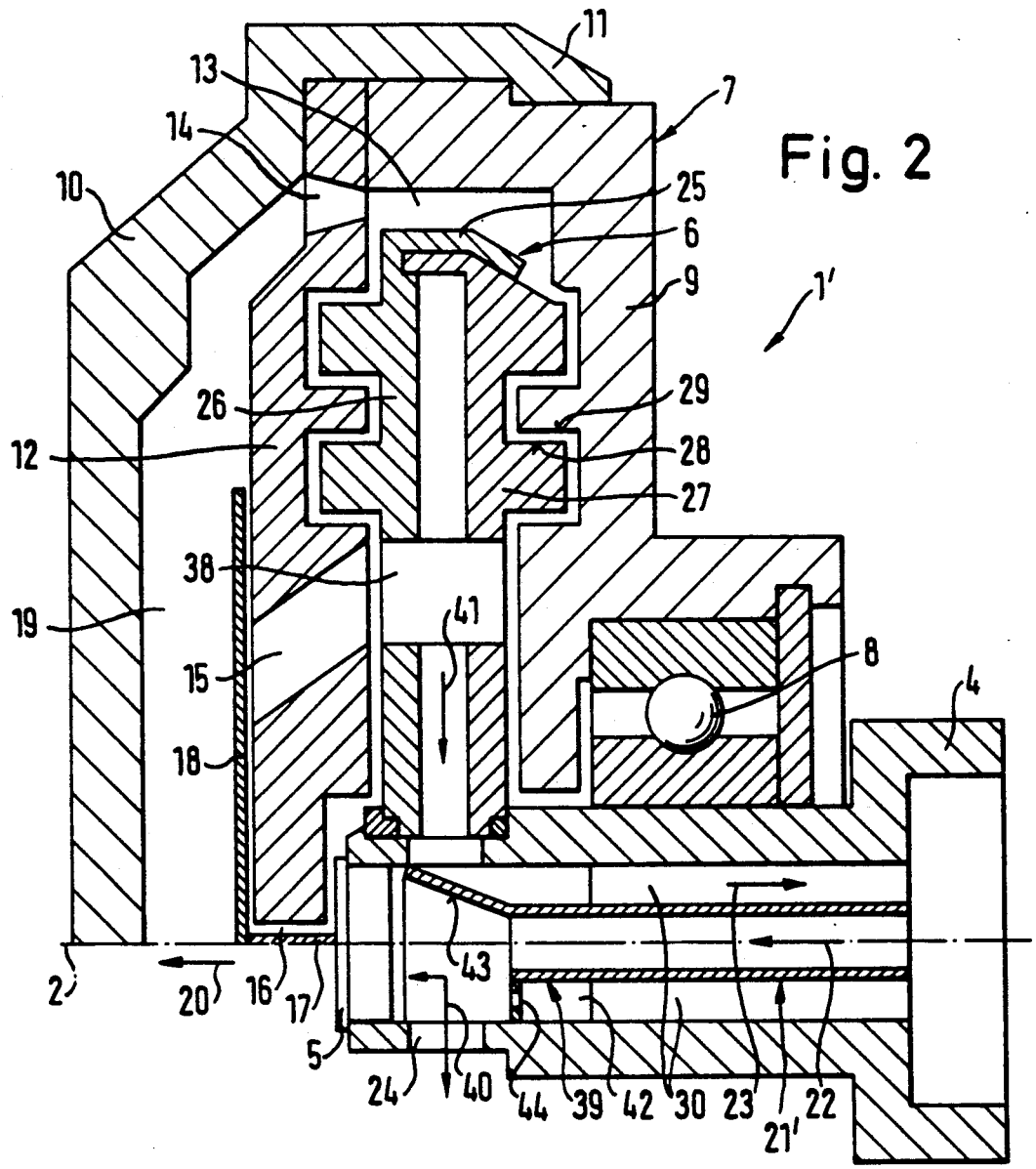

In order to permit a good coolant circulation in the hollow shaft 3, which is appropriate for a rapid control process, in hollow shaft 3 is inserted a pipe length 21, which is held coaxially therein by means of radially oriented spacers 302 (FIG. 2). Coolant can flow through pipe length 21 in accordance with arrow 22 up to the temperature regulator 5. The return flow takes place according to arrow 23 in the remaining annular space between the spacers. Obviously the flow directions can be reversed.

In order to cool the fluid coupling 1 the pump impeller 6 is constructed as a hollow body for receiving coolant. The cavity 19 of pump impeller 6 is connected via radial openings 24 in hollow shaft 3 to the interior thereof, so that the coolant flowing there can also circulate in pump impeller 6 in accordance with arrows 35.

As illustrated in FIG. 1, for this purpose the pump impeller 6 comprises two half-shells 26, 27 joined at their outer circumference by means of a sleeve 25.

In order that any axial or radial clearance between the pump impeller 6 and the turbine wheel 7 does not impair the overall gap between these two members, the effective surface of the pump impeller 6 is provided with circumferentially directed indentations 28, in which engage corresponding counterparts 29 on one half-shell 9 and disk 12 of turbine wheel 7.

According to FIG. 1 the indentations 28 and counterparts 29 have a triangular cross-section. FIG. 2 illustrates an example for a rectangular cross-section for the indentations 28 and their counterparts 29.

FIG. 2 also shows that the pump impeller 6 is provided with axially directed passage openings 38, which assist the distribution of the backflowing operating fluid in pump chamber 13. The passage openings 38 are circumferentially distributed over the pump impeller 6. They are located in the continuation of the inlet ports 15, so that the operating fluid can in a short time reach both sides of the pump impeller 6.

A further detail by which the fluid coupling 1' of FIG. 2 differs from fluid coupling 1 of FIG. 1, involves the construction of the pipe length 21. The latter is provided at its free end in the vicinity of the hollow shaft openings 24 with a distributor 39, which serves to guide the inflowing coolant in accordance with double arrow 40 on temperature regulator 5 and over the hollow shaft openings 24 into pump impeller 6, without the fluid flow mixing with the coolant flowing back from pump impeller 6 according to arrow 41. The distributor 39 also serves to distribute over the channels formed in the remaining annular space by control surfaces 30 the backflowing coolant, via an uninterrupted annular space 42.

In the presently represented embodiment, the distributor 39 comprises a funnel-shaped widened portion of the free outlet port of pipe length 21, which shields the temperature regulator 5 against part of the hollow shaft openings 24. The distributor 39 also comprises a branch 44 forming the connection with the remaining hollow shaft openings 24. Behind branch 44 is located the annular space 42, which is formed by the corresponding axial setting back of walls 30.

Figure 3:
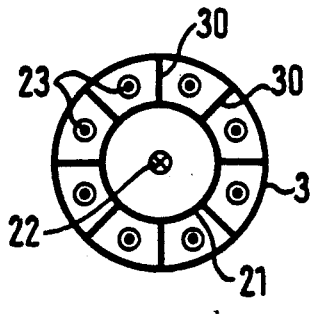
FIG. 3 diagrammatically shows a plan view of a detail of the fluid coupling of FIGS. 1 and 2.

FIG. 3 shows a cross-section through hollow shaft 3 and the inserted pipe length with the walls 30 serving as spacers. The drawing illustrates that the hollow shaft 3 is subdivided by the pipe length and walls 30 into several channels for the coolant, so as to permit the circulation of the latter.

Figure 4:
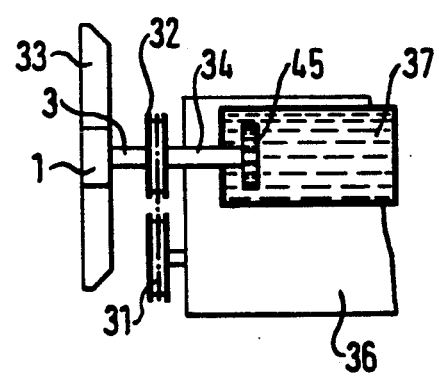
FIG. 4 diagrammatically shows a fan arrangement for cooling the motor.

FIG. 4 diagrammatically shows a temperature-regulated fan arrangement for an internal combustion engine or motor with an engine block 36 in a motor vehicle. A belt drive 31 acts on a driving disk 32 on hollow shaft 3, which by means of the fluid coupling 1 drives a fan wheel 33. A line 34 passes coolant from the coolant circuit 37 of the engine into the fluid coupling and in the aforementioned manner carries out a temperature-dependent slip control or speed control. In the presently represented embodiment the line 34 comprises a further hollow shaft on which is located a pump impeller 45 of a coolant pump. The further hollow shaft also serves to drive the pump impeller 45.

Figure 5:
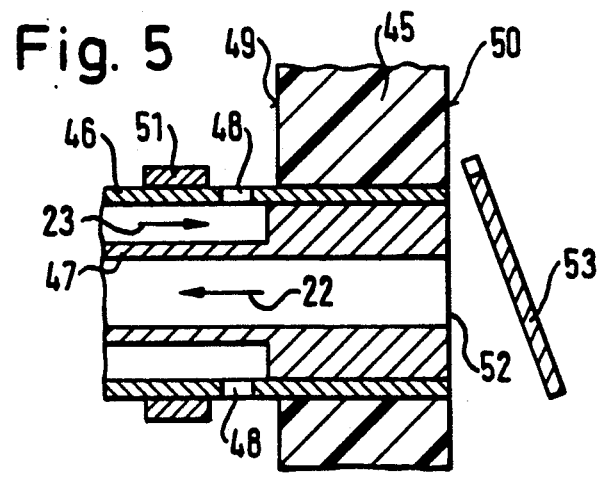
FIG. 5 diagrammatically shows a cross-section through a pump impeller of a coolant pump according to FIG. 4.

FIG. 5 illustrates a few details in conjunction with the pump impeller 45, which is located on the further hollow shaft 46, which is provided with a pipe length-like insert 47. Corresponding to pipe length 21 in the driving shaft of fluid coupling 1, insert 47 forms an annular space issuing on the suction side 49 of pump impeller 45 by means of outlets distributed over the circumference of the further hollow shaft 46. Thus, according to arrow 23, coolant is sucked from the further hollow shaft 46 and therefore from the fluid coupling 1. A throttling of this fluid flow can take place in the present embodiment by means of a ring 51, which is placed over the outlets 48. Fundamentally the outlets 48 can also be integrated into the pump impeller 45.

In order to pump coolant into the further hollow shaft 46 and therefore into the fluid coupling 1, insert 47 also has on the pressure side 50 of pump impeller 45 an intake 52. Alternatively to ring 51, it is also possible to regulate the cooling fluid by means of a throttle valve 53 located on the shaft end upstream of intake 52.

The pump impellers 6, 45 of the fluid coupling 1 and the coolant pump can be driven by means of a common hollow shaft.

What we claim is:

1. A fan-hydraulic coupling for a water-cooled motor, comprising:

a hollow drive shaft connected at a first end to a cooling liquid circuit of the motor and at a second end to the hydraulic coupling for cooling the hydraulic coupling, an interior of said hydraulic coupling being connected to said hollow drive shaft through radial hollow shaft openings for exchanging cooling liquid; and a pump impeller designed as a cooling body and partially defining a hollow body, said hollow body defining a hollow space within said pump impeller which is connected to said hollow drive shaft through said radial hollow shaft openings.

2. The hydraulic coupling according to claim 1, wherein said pump impeller comprises two half-shells which form said hollow space.

3. The hydraulic coupling according to claim 2, wherein said tow half-shells are each formed from sheet metal.

4. The hydraulic coupling according to one of the preceding claims, wherein said hollow drive shaft comprise at least two axial passage means for the cooling liquid which are formed by a pipe piece having radial spacers inserted into said hollow drive shaft.

5. The hydraulic coupling according to claim 4, wherein the spacers are designed as deflectors for the formation of the axial passage means in the hollow drive shaft.

6. The hydraulic coupling according to claim 5, wherein said hollow shaft openings are distributed over the periphery of the hollow drive shaft for connecting the hollow space of the pump impeller to the hollow drive shaft, and wherein the pipe piece is provided on one of its ends with distributing means for separating outward and return cooling liquid flow.

7. The hydraulic coupling according to claim 6, wherein the periphery of the pipe piece comprises an uninterrupted annular space formed by said pipe piece in an area of the hollow shaft openings.

8. The hydraulic coupling according to claim 7, wherein said pump impeller comprises axially directed passage openings.

9. The hydraulic coupling according to claim 7, further comprising a turbine wheel, said turbine wheel comprising intake orifices which are aligned with said passage openings of said impeller.

10. The hydraulic coupling according to claim 9, wherein said turbine wheel and said impeller have mutually facing surfaces which are provided with circumferentially directed indentations and corresponding counterparts, which have a triangular cross section.

11. The hydraulic coupling according to claim 1, comprising a further hollow shaft connected to the drive hollow shaft, said further hollow shaft being a drive shaft for a pump impeller of a cooling liquid pump in said cooling liquid circuit of the motor said further hollow shaft comprising axially extending inset means wherein an inner wall of said further hollow shaft and said axially extending inset means define at least two axially directed cuts within said further hollow shaft, wherein one of said at least two axially directed ducts comprises an opening on a suction side and the other an opening on a pressure side of said pump impeller, wherein the further hollow shaft comprises at least one externally operable throttle.

12. The hydraulic coupling according to claim 11, wherein said throttle is a throttle valve which is positioned upstream of an opening located on an end of said further hollow shaft end and directed in an axial direction.

13. The hydraulic coupling according to claim 11, wherein said throttle is a slide valve positioned on the further hollow shaft for a radially directed opening.

* * * * *